United States Patent [19]

Stanyard et al.

[11] Patent Number: 4,671,390
[45] Date of Patent: Jun. 9, 1987

[54] CONVERTER-POWERED DRIVE FOR AN ELEVATOR

[75] Inventors: Ray Stanyard; Hansruedi Liechti, both of Buchrain, Switzerland

[73] Assignee: Inventio AG, Hergiswil, Switzerland

[21] Appl. No.: 760,062

[22] Filed: Jul. 29, 1985

[30] Foreign Application Priority Data

Aug. 9, 1984 [CH] Switzerland ................. 3821/84

[51] Int. Cl.⁴ .............................................. B66B 1/32
[52] U.S. Cl. ................................................... 187/120
[58] Field of Search ............ 318/258, 259; 187/29 R; 363/2, 3, 4, 5, 84, 87, 88, 125, 126, 128, 129

[56] References Cited

U.S. PATENT DOCUMENTS

| | | | |
|---|---|---|---|
| 2,103,950 | 12/1937 | Leukert | 363/2 |
| 3,210,635 | 10/1965 | Ogden et al. | 363/3 |
| 3,463,991 | 8/1969 | Yuminaka et al. | 318/258 |
| 3,821,628 | 6/1974 | Westinghouse . | |
| 4,209,082 | 6/1980 | Mitsubishi . | |
| 4,284,175 | 8/1981 | Mitsubishi . | |
| 4,375,612 | 3/1983 | Borg-Warner . | |
| 4,493,016 | 1/1985 | Cham et al. | 363/126 |

FOREIGN PATENT DOCUMENTS

| | | |
|---|---|---|
| 1107784 | 5/1961 | Fed. Rep. of Germany . |
| 82749 | 2/1964 | France . |
| 2260218 | 8/1975 | France . |

OTHER PUBLICATIONS

Publication by A. Z. Walach, "Automatic Loop-Gain Regulation", IBM Technical Disclosure Bulletin, vol. 13, No. 10, pp. 2904-2906, Mar. 1971.

Primary Examiner—William M. Shoop, Jr.
Assistant Examiner—Richard K. Blum
Attorney, Agent, or Firm—Werner W. Kleeman

[57] ABSTRACT

A twelve-pulse converter has an a.c.-input and a d.c.-output which is connected with an armature via two thyristors of a change-over circuit. An extinguishing circuit comprises a resistor, a capacitor, an inductor and a thyristor which is also connected with the armature via related diodes. A current transformer in the armature circuit causes ignition of the thyristor in the extinguishing circuit at the occurrence of excess current. The extinguishing capacitor is continuously connected with a charging circuit and is connected parallel to the thyristor of the extinguishing circuit and with the thyristors connected to the d.c.-negative pole. The d.c.-negative pole connected thyristors are cut-off when the thyristor of the extinguishing circuit is ignited and the energy appearing in the armature circuit is dissipated by the resistor in the extinguishing circuit. The zero-crossing of the current is detected by means of two voltage converters which are connected with the d.c.-negative pole and the d.c.-positive pole of the converter as well as with the armature. The non-current conducting thyristors which are connected either with the d.c.-negative pole or with the d.c.-positive pole, are ignited by means of information derived from the voltage converters.

3 Claims, 1 Drawing Figure

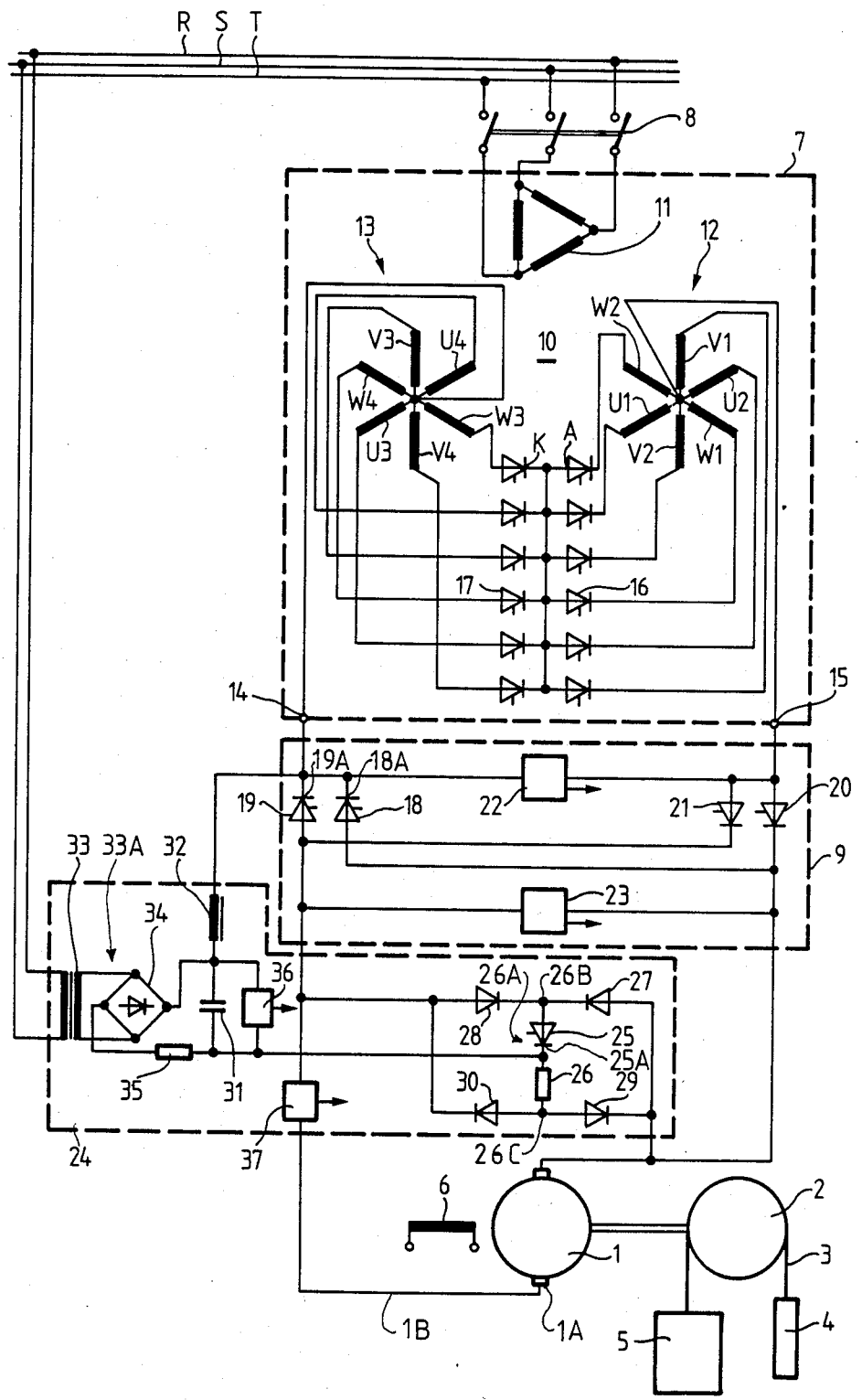

CONVERTER-POWERED DRIVE FOR AN ELEVATOR

BACKGROUND OF THE INVENTION

The present invention relates to a new and improved converter-powered drive for an elevator and which is connected to an a.c.-voltage source.

In its more specific aspects, the present invention relates to a new and improved converter-powered drive for an elevator and connected to an a.c. voltage source. This drive contains a d.c.-electro-motor having an armature connected with the a.c. voltage source via a converter which has only one current-flow direction. The converter-powered drive further contains a switching circuit for torque reversal which is arranged between the converter and the armature and which comprises four thyristors. Two of the four thyristors are connected between the d.c.-negative pole of the converter and the armature and the other two of the four thyristors are connected between the d.c.-positive pole of the converter and the armature. There is further provided an extinguishing circuit containing at least one capacitor, an inductor, a resistor and a thyristor. The extinguishing circuit protects the thyristors of the converter upon the occurrence of excess current and dissipates, by means of the resistor, the energy appearing in the armature circuit.

In a similar drive as known, for example, from U.S. Pat. No. 4,209,082, granted June 24, 1980, the capacitor of the extinguishing circuit is charged each time before a travel start of the elevator car conjointly with the ignition of the thyristors in the converter. The extinguishing circuit possesses a detector which causes the ignition of the thyristor in the extinguishing circuit upon the occurrence of a line voltage or power failure and, as a result, the thyristors of the converter are cut-off by the discharge of the capacitor.

In the aforementioned converter-powered drive, it is possible that, for example, due to a defective component, it is unnoticed by the control that the capacitor is not charged so that the thyristors cannot be cut-off. It is a further disadvantage that the extinguishing circuit cannot be activated upon the occurrence of an excess current which is not caused by a line voltage or power failure. The switching circuit for torque reversal must be controlled at the occurrence of a line voltage or power failure as well as during normal operation in such a manner that the energy can be dissipated or conducted away and which energy is generated by the motor when the motor is operated in the manner of a generator. No solution for this problem is given in the aforementioned U.S. Pat. No. 4,209,082. Additionally, it is possible that the energy which is generated during the generator operation of the motor, is only incompletely dissipated or conducted away when a main contactor is too rapidly opened and which contactor is arranged between the extinguishing circuit and the armature.

In drives of the aforementioned type, the converter is designed in most cases as a three-phase a.c.-bridge circuit which generates a six-pulse output voltage. In order to reduce the unfavorable effects on the armature circuit due to the d.c.-ripple and also the interfering effects of harmonics on the mains supply occurring during the operation of such a circuit, there can be employed, for example, filter circuits. Thus, a low-pass filter is arranged between the converter and the armature of the drive motor in the converter-powered drive as known, for example, from U.S. Pat. No. 3,821,628, granted June 28, 1974. This drive comprises a converter constructed from two three-phase a.c.-bridge circuits which are connected in parallel opposition to each other. The machine noise caused by the harmonics is intended to be attenuated by the low-pass filter. In order to also maintain small the distortion on the mains, additional filters would have to be employed, whereby the equipment costs would be further increased.

It is otherwise known to reduce the d.c.-ripple by using converters with higher pulse numbers. There is thus described, for example, in German Patent No. 1,107,784, granted May 31, 1961, a twelve-pulse converter for reversable drives in which the parallel opposition connection is constructed with interphase reactors. In this converter two transformers with six-phase secondary windings which are offset from each other by 30°, are used in a star or Y-connection for the power supply. The number of rectifiers in this converter corresponds to twice the pulse number and thereby the costs are considerably increased. Considering further the expense due to the interphase reactors, such a converter would appear unsuited for use in combination with elevators.

SUMMARY OF THE INVENTION

Therefore, with the foregoing in mind, it is a primary object of the present invention to provide a new and improved construction of a converter-powered drive for an elevator and connected to an a.c. voltage source, which converter-powered drive has only small d.c.-ripple and causes merely insignificant distortion on the mains.

Another and more specific object of the present invention aims at the provision of a new and improved construction of a converter-powered drive for an elevator and connected to an a.c.-voltage source and in which converter-powered drive, the thyristors contained in the converter can be cut-off when excess currents flow which are not caused by line voltage or power failure, and in which converter-powered drive, no emergency stop is caused as a result of a short-time power drop or break-down.

Still a further significant object of the present invention is directed to a new and improved construction of a converter-powered drive for an elevator and connected to an a.c.-voltage source, and in which converter-powered drive the switching circuit or device for torque reversal is improved in such a manner that the switching circuit or device does not have to be switched for dissipating or conducting away the energy generated by the d.c.-electro-motor, but that during normal operating conditions, a rapid and reliable switch-over is enabled from motor operation to generator operation and vice versa.

Now in order to implement these and still further objects of the present invention, which will become more readily apparent as the description proceeds, the converter-powered drive of the present development is manifested by the features that, the converter constitutes a twelve-pulse converter containing two series-connected twin star connections. The thyristor and the resistor in the extinguishing circuit form a series-connection and the terminals of this series-connection are each connected via two diodes with the armature of the d.c.-electro-motor. The extinguishing circuit contains a current transformer which is arranged within the armature circuit and which causes the ignition of the thyristor contained in the extinguishing circuit at the occurrence of excess current. The capacitor of the extinguishing circuit is connected, on the one hand, with the cathode of the thyristor of the extinguishing circuit and with the cathodes of the thyristors in the switching circuit or device, on the other hand, which last mentioned thyristors are connected to the d.c.-negative pole of the converter. At the occurrence of excess current and on ignition of the thyristor in the extinguishing circuit, the d.c.-negative pole connected thyristors of the switching circuit are cut-off and the converter is separated or disconnected from the d.c.-electro-motor.

The switching circuit or device contains two voltage converters. One of the voltage converters is connected with the d.c.-output of the converter, and the other one of the two voltage converters is connected with the armature. A control signal for igniting the two non-current conducting thyristors of the four thyristors in the switching circuit or device can be derived from the voltage difference which is detected during the zero-crossing of the current flowing through the two current conducting thyristors of the four thyristors in the switching circuit.

In the inventive convertor-powered drive, the twelve-pulse converter comprises two series-connected twin star or Y-connections. The resistor and the thyristor in the extinguishing circuit are connected via diodes directly with the armature of the d.c.-electro-motor and a current transformer is arranged within the armature circuit and causes the ignition of the thyristor in the extinguishing circuit upon the occurrence of excess current. The capacitor is continuously connected with the a.c.-voltage source via a charging circuit. The capacitor is connected parallel to the thyristor of the extinguishing circuit and to the thyristors of the switching circuit which are associated with the d.c.-negative pole of the converter. As a result, these thyristors which are associated with the d.c.-negative pole of the converter, are cut-off at the occurrence of excess current and on ignition of the thyristor in the extinguishing circuit, and the energy occurring in the armature circuit is dissipated by means of the resistor in the extinguishing circuit. The switching circuit or device comprises two voltage converters, one on the converter side and the other one on the armature side of the switching circuit or device. A control signal for igniting the two non-current conducting thyristors of the switching circuit or device can be derived from the voltage difference detected during the zero-crossing of the current flowing through the two current conducting thyristors of the switching circuit or device.

It is one of the advantages achieved by the invention that, due to the use of a twelve-pulse converter, only a small d.c.-ripple and merely insignificant distortions occur upon the mains, so that no filters are required. The inventive converter-powered drive enables the use of commercial twin-thyristors which are combined to form a constructional unit, whereby the construction is simplified in a cost-saving manner. Due to the combination of a twelve-pulse converter which is designed for only one current-flow direction, with a switching circuit or device for torque reversal, there are achieved savings with respect to the number of thyristors and the expense of the control means required for their ignition.

In the inventive converter-powered drive, the extinguishing circuit also detects excess currents which are not caused by line voltage or power failure, and continuously monitors the charging state of the capacitor of the extinguishing circuit. The capacitor is arranged in the extinguishing circuit such that only one thyristor of the switching circuit or device must be cut-off in order to protect all of the thyristors.

In the inventive converter-powered drive, the arrangement of the resistor and of the thyristor in the extinguishing circuit simplifies the control operation upon the occurrence of excess current because otherwise measures would have to be provided for igniting the related thyristors in the switching circuit or device. By using the arrangement of voltage converters in the inventive converter-powered drive the current zero-crossing during the change from the motor operation to generator operation can be precisely detected which otherwise would be impossible in the usually employed converters.

BRIEF DESCRIPTION OF THE DRAWING

The invention will be better understood and objects other than those set forth above will become apparent when consideration is given to the following detailed description thereof. Such description makes reference to the annexed drawing wherein the single figure shows a schematic block circuit diagram of the converter-powered drive according to the invention.

DETAILED DESCRIPTION OF THE PREFERRED EMBODIMENTS

Describing now the drawing, it is to be understood that only enough of the construction of the converter-powered drive has been shown as is needed to enable one skilled in the art to readily understand the underlying principles and concepts of the present invention, while simplifying the drawing. The drive motor of an elevator is generally designated by the reference numeral 1 in the single figure of the drawing. This drive motor 1 drives an elevator car 5 which is suspended from a hoisting rope 3 via a traction sheave or pulley 2 and which is balanced by means of a counterweight 4. The drive motor 1 constitutes an externally excited d.c.-electro-motor having an exciter winding 6 which is connected with a not illustrated d.c.-voltage source.

A converter is generally designated by the reference numeral 7. This converter 7 is connected with a three-phase a.c.-power system RST via contacts 8 of a main contactor, on the one hand, and with the armature 1A of the d.c.-electro-motor 1 via a switching circuit 9 for torque reversal. The converter 7 constitutes a 12-pulse converter designed only for one current-flow direction. A transformer 10 of the converter 7 comprises conventional delta connected windings 11 on its primary side. Twelve windings are provided on the secondary side of the transformer 10 and the twelve windings are combined to form twin star or Y-connections 12 and 13. The windings U1, V1, W1, U2, V2 and W2 of the twin star or Y-connection 12 are offset by 30° from the windings U3, V3, W3, U4, V4 and W4 of the other twin star or Y-connection 13. The star or neutral point of the twin star or Y-connection 12 is connected to a d.c.-positive pole 15 of the converter 7 and the star or neutral point of the twin star or Y-connection 13 is connected with a d.c.-negative pole 14 of the converter 7.

The terminals of the windings which are opposite to the star or neutral points, are each interconnected via two series-connected thyristors (e.g. 16 and 17). Preferably, commercially available twin-thyristors combined to form a constructional unit are employed as the thyristors 16 and 17. The connection is made in such a manner that each one of the windings U1, V1, W1, U2, V2 and W2 of the twin star of Y-connection 12 is connected via two thyristors (e.g. 16 and 17) with a related one of the windings U3, V3, W3, U4, V4 and W4 of the other twin star or Y-connection 13. Furthermore, all of the interconnected terminals A and K of the series-connected thyristors 16 and 17 are connected with each other. In order to regulate the rotational speed of the d.c.-electro-motor 1, the control electrodes of the thyristors 16 and 17 are connected with ignition control means of a not illustrated regulation circuit.

A switching circuit or device 9 for torque reversal contains four thyristors 18, 19, 20 and 21. Two of the four thyristors, namely the thyristors 18 and 19, are connected by means of their cathodes 18A and 19A with the d.c.-negative pole 14 of the converter 7. The anodes of these two thyristors 18 and 19 are each connected to a related brush of the armature 1A of the d.c.-electro-motor 1. Two further thyristors of the aforementioned four thyristors 18 to 21 in the switching circuit or device 9, namely the thyristors 20 and 21, are connected by means of their anodes with the d.c.-positive pole 15 of the converter 7 and by means of their cathodes to a related brush of the armature 1A of the d.c.-electro-motor 1. For the purpose of switching the torque direction, the control electrodes of the four thyristors 18, 19, 20 and 21 are connected with the aforementioned ignition control means and one of the thyristors 18 and 19 connected with the d.c.-negative pole 14 of the converter 7 and one of the thyristors 21 and 20 connected with the d.c.-positive pole 15 of the converter 7 is associated with a predetermined torque direction. During operation of the converter-powered drive, one pair of the four thyristors in the switching circuit or device 9, namely the thyristors 19 and 20 or 18 and 21, as the case may be, forms a pair of current conducting thyristors while another pair of the thyristors, namely the thyristors 18 and 21 of 19 and 20, as the case may be, forms a pair of non-current conducting thyristors.

The switching circuit or device 9 further comprises two voltage converters generally designated by reference numerals 22 and 23. The voltage converter 22 is connected with the d.c.-negative pole 14 and the d.c.-positive pole 15 of the converter 7 and the other voltage converter 23 is connected with the armature 1A of the d.c.-electro-motor 1. On their secondary side, the voltage converters 22 and 23 are connected with a not illustrated monitoring circuit which forms a difference from the measured voltages and compares this difference with a predetermined value of such difference. During the transition from motor operation to generator operation, and when the current drops below the thyristor holding current, the pair of current conducting thyristors 18 and 21 or 19 and 20, as the case may be, in the switching circuit or device 9 block. As a consequence, the voltage difference exceeds the predetermined value and a control signal is generated for igniting the non-current conducting thyristors 18 and 21 or 19 and 20, as the case may be, in the switching circuit or device 9.

An extinguishing circuit 24 contains a series connection 26A of a thyristor 25 and a resistor 26. Each terminal 26B and 26C of this series-connection is connected the armature 1A of the d.c.-electro-motor 1 via two respective diodes 27, 28 and 29, 30. A capacitor 31 is connected with a cathode 25A of the thyristor 25, on the one hand, and via an inductor 32 with the cathodes 18A and 19A of the thyristors 18 and 19 in the switching circuit or device 9, on the other hand, which thyristors 18 and 19 are associated with the d.c.-negative pole 14 of the converter 7. The capacitor 31 is connected with a charging circuit 33A which is connected to the three-phase a.c.-power system and which comprises a transformer 33, a rectifier 34 and resistor 35. An opto-coupler 36 is connected parallel to the capacitor 31 and is connected with a not illustrated safety circuit for the purpose of monitoring the charging state of the capacitor 31.

A current transformer 37 is arranged within the armature circuit 13 and this current transformer 37 if connected on its secondary side with the aforementioned ignition control means.

At the occurrence of an excess current, for example, due to a line voltage or power failure, the thyristor 25 in the extinguishing circuit 24 is ignited and, as a result, the capacitor 31 discharges in a direction opposite to the through-flow direction of one of the pair of current conducting thyristors 18 or 19, as the case may be, which is associated with the d.c.-negative pole 14 of the converter 7. The related thyristor 18 or 19 is cut-off thereby and the converter 7 is separated or disconnected from the d.c.-electro-motor 1. During this operation, the choke 32 acts in such a manner that the current increase does not occur too rapidly. The current flowing at this moment of time through the armature circuit 1B is conducted via the diodes 27 and 30 or 28 and 29, as the case may be, and via the thyristor 25 and the resistor 26 of the extinguishing circuit 24 and is limited by the resistor 26.

While there are shown and described present preferred embodiments of the invention, it is to be distinctly understood that the invention is not limited thereto, but may be otherwise variously embodied and practiced within the scope of the following claims.

Accordingly,

What we claim is:

1. A converter-powered drive for an elevator and connected to an a.c.-voltage source, comprising:
   a d.c.-electro-motor containing an armature connected in an armature circuit;
   a converter defining only one direction of current flow and containing a predetermined number of thyristors;
   said armature being connected to said a.c.-voltage source via said converter;
   said converter possessing a d.c.-negative pole and a d.c.-positive pole;
   a switching circuit for torque reversal and connected between said converter and said armature;
   said switching circuit comprising four thyristors which contain related cathodes;
   two of said four thyristors being connected between said d.c.-negative pole of said converter and said armature and two further thyristors of said four thyristors being connected between said d.c.-positive pole of said converter and said armature;
   an extinguishing circuit operatively associated with said switching circuit;
   said extinguishing circuit at least containing a capacitor, an inductor, a resistor, and a thyristor possessing a cathode;
   said extinguishing circuit, upon the occurrence of excess current, protecting said thyristors of said converter and said resistor of said extinguishing circuit dissipating the energy appearing in said armature circuit;

said converter constituting a twelve-pulse converter comprising two series-connected twin star connections;

said thyristor and said resistor of said extinguishing circuit forming a series-connection having two terminals;

each terminal of said series-connection being connected to said armature via two related diodes;

said extinguishing circuit further containing a current transformer which is arranged in said armature circuit and which causes ignition of said thyristor of said extinguishing circuit upon the occurrence of said excess current;

said capacitor of said extinguishing circuit being connected to said cathode of said thyristor in said extinguishing circuit and to said cathodes of said two of said fourth thyristors in said switching circuit which are connected between said d.c.-negative pole of said converter and said armature;

one of said two thyristors being extinguished upon the occurrence of said excess current and upon ignition of said thyristor in said extinguishing circuit, whereby said converter is disconnected from said d.c.-electro-motor;

said switching circuit further containing two voltage converters;

one of said two voltage converters being connected to said d.c.-negative pole and said d.c.-positive pole of said converter, and an other one of said two voltage converters being connected with said armature;

one pair of said four thyristors in said switching circuit constituting a current conducting pair of thyristors, and an other pair of said fourth thyristors in said switching circuit constituting a non-current conducting pair of thyristors; and said two voltage converters serving to generate, as a result of a voltage difference existing during a zero-crossing of the current flowing through said pair of current conducting thyristors, a control signal controlling the ignition of said other pair of non-current conducting thyristors.

2. The converter-powered drive as defined in claim 1, wherein:

said converter further comprises a transformer having twelve secondary windings;

said twelve secondary windings of said transformer being combined such as to form two twin star connections;

each winding of one of said two twin star connections being offset by 30° from a corresponding winding of an other one of said two twin star connections;

said one of said two twin star connections defining a star point connected to said d.c.-negative pole of said converter;

said other one of said two twin star connections defining a star point connected to said d.c.-positive pole of said converter;

each said winding of one of said two twin star connections being connected via two series-connected thyristors to a winding of said other one of said two twin star connections; and each said two series-connected thyristors being connected at predetermined terminals of said thyristors, and said predetermined terminals of all of said two series-connected thyristors being interconnected.

3. The converter-powered drive as defined in claim 1, wherein:

said extinguishing circuit further contains a choke;

said choke being series-connected with said capacitor;

a charging circuit;

said capacitor being continuously connected to said a.c. voltage source via said charging circuit;

an opto-coupler; and said opto-coupler being connected parallel to said capacitor and monitoring the charging state of said capacitor.

* * * * *

UNITED STATES PATENT AND TRADEMARK OFFICE
CERTIFICATE OF CORRECTION

PATENT NO. : 4,671,390
DATED : June 9, 1987
INVENTOR(S) : RAY STANYARD et al

It is certified that error appears in the above-identified patent and that said Letters Patent is hereby corrected as shown below:

In the Abstract, line 3, please delete "change-over" and insert --charge-over--

Column 5, line 3, please delete "of" and insert --or--

Column 5, line 16, please delete "connectec" and insert --connected--

Column 5, line 39, please delete "of" and insert --or--

Column 6, line 12, please delete "tne" and insert --the--

Column 7, line 19, please delete "fourth" and insert --four--

Column 7, line 36, please delete "fourth" and insert --four--

Signed and Sealed this

Twenty-ninth Day of March, 1988

Attest:

DONALD J. QUIGG

Attesting Officer

Commissioner of Patents and Trademarks